United States Patent
Goder et al.

[11] Patent Number: 5,978,195
[45] Date of Patent: Nov. 2, 1999

[54] CIRCUIT PROTECTION ARRANGEMENT

[76] Inventors: Dimitry Goder, 2151 Paseo Del Oro, San Jose, Calif. 95124; William Pelletier, 1695 Cherry Ave., San Jose, Calif. 95125

[21] Appl. No.: 09/027,682

[22] Filed: Feb. 23, 1998

[51] Int. Cl.$^6$ .................................................... H02H 3/00
[52] U.S. Cl. ................................ 361/94; 361/86; 361/71; 363/50
[58] Field of Search .................................. 361/86, 18, 71, 361/74, 93–94; 323/274–277; 363/50

[56] References Cited

U.S. PATENT DOCUMENTS

| | | | |
|---|---|---|---|
| 3,560,837 | 2/1971 | Gately | 321/14 |
| 3,729,671 | 4/1973 | Jeffery et al. | 321/11 |
| 3,800,198 | 3/1974 | Graf et al. | 318/227 |
| 3,982,173 | 9/1976 | Berry et al. | 323/17 |
| 4,716,488 | 12/1987 | Segger | 361/88 |
| 4,819,117 | 4/1989 | Brennan et al. | 361/18 |
| 4,896,242 | 1/1990 | Neft | 361/87 |
| 5,086,364 | 2/1992 | Leipold et al. | 361/18 |
| 5,091,816 | 2/1992 | Juntenen | 361/18 |
| 5,117,325 | 5/1992 | Dunk et al. | 361/93 |
| 5,132,890 | 7/1992 | Blandino | 363/21 |
| 5,164,877 | 11/1992 | Furuhata et al. | 361/111 |
| 5,233,287 | 8/1993 | Lenk | 323/268 |
| 5,341,282 | 8/1994 | Brambilla et al. | 363/50 |
| 5,369,541 | 11/1994 | Normet | 361/0.85 |
| 5,510,944 | 4/1996 | Mozar et al. | 361/18 |
| 5,528,132 | 6/1996 | Doluca | 323/284 |
| 5,543,760 | 8/1996 | Honda et al. | 330/298 |
| 5,635,824 | 6/1997 | Noguchi | 323/284 |

OTHER PUBLICATIONS

Data Sheet for TL5001, TL5001Y, Pulse–Width–Modulation Control Circuits, SLVS084C–Apr. 1994–Revised Sep. 1995, Texas Instruments.
Designing with the TL5001 PWM Controller, SLVZ034A, Sep. 1995, Texas Instruments.

*Primary Examiner*—Jeffrey Gaffin
*Assistant Examiner*—Michael J. Sherry

[57] ABSTRACT

A fault protection arrangement for protecting power conversion circuits, for example switch mode power supplies and the like, from overcurrent and short circuit faults. The fault protection arrangement includes multiple fault protection features, for example soft-start delay, fault delay and automatic reset, with the timing of each of these three features capable of being set independently of the other two while minimizing integrated circuit (IC) pin count and also minimizing the number of external components required for programming the timing of these features. The fault protection circuit may be used to advantage with any power conversion regulator topology.

15 Claims, 3 Drawing Sheets

CIRCUIT PROTECTION ARRANGEMENT

FIELD OF THE INVENTION

This invention relates to electrical circuit protection. More particularly, the invention relates to an arrangement which provides output overcurrent and short circuit protection in power conversion applications.

BACKGROUND OF THE INVENTION

In power conversion, two common failure modes are output overcurrent and output short circuit. Circuit protection arrangements intended to protect against these faults are typically designed to sense the actual output current, for example by measuring the voltage drop across a series sense resistor, power switch, current transformer or the like. These approaches can provide satisfactory protection from overcurrents and short circuits. However, these approaches require additional components which add cost and complexity to the power conversion system. Also, implementations which use components in series with the output, for example a sense resistor, may result in significant additional power dissipation.

In other arrangements, the occurrence of an overcurrent or short circuit may be monitored indirectly, and, in some cases, avoid dissipating excessive additional power. An example of an alternative approach is in the TL5001 Pulse Width Modulation (PWM) Controller made by Texas Instruments. FIG. 1 is a functional block diagram of the TL5001 PWM Controller 10. FIG. 2 is a schematic diagram for a typical power supply circuit 30 using the TL5001 PWM Controller 10.

The diagrams of FIGS. 1 and 2 will be described only to the extent necessary to explain the overcurrent and short circuit protection approach included in the TL5001 PWM Controller.

Referring to FIG. 1, an error amplifier 12 compares a reference voltage 11 with the voltage at a feedback (FB) pin input 13 of the TL5001 PWM Controller 10. Referring to FIG. 2, the input to the FB pin 13 is coupled to the power supply output 15 by a network 17 which sets the gain of the error amplifier 12, and to the compensation (COMP) pin output 16 by a compensation network 9 used in compensating the dc-to-dc converter control loop for stability. Referring again to FIG. 1, in case of a fault, for example if the power supply output 15 is shorted to ground, the error amplifier output 14 output reacts by swinging high to compensate for the low voltage at the power supply output 15. The error amplifier output 14 is coupled to an inverting input 19 of a first short circuit protection (SCP) comparator 20. The first SCP comparator 20 detects the voltage swing and charges an SCP capacitor 21 (FIG. 2) through a current source. The SCP capacitor 21 delays the operation of the fault protection circuitry so that the arrangement does not falsely trigger due to noise, load transients, line transients and the like. This delay will be referred to herein as "fault-delay."

The protection arrangement may include a "soft-start" function in which the operation of the protection arrangement is delayed upon startup to prevent erroneous fault detection due to startup transients. This delay will be referred to herein as "soft-start-delay." In order for the arrangement to function properly, the fault-delay must be longer than the soft-start-delay. If the fault-delay is shorter than the soft-start-delay, then during startup the circuit protection arrangement can trigger after the fault-delay time, even if the soft-start-delay time has not elapsed, and prevent the regulator from starting. This is a limitation of this protection arrangement.

In case of a fault, the SCP capacitor 21 charges to above a predetermined voltage which is monitored by a second SCP comparator 22, and, if a fault is still present, then the second SCP comparator 22 will disable the drive logic and latch the regulator circuit in the off state. The input power must be recycled to restart the regulator circuit.

The fault protection arrangement built into the TL5001 PWM Controller has several limitations. Because the output voltage is input to an error amplifier, the performance of the arrangement is dependent on the characteristics of the error amplifier, e.g. the gain selected. In particular, the trip voltage at which the protection circuit disables the PWM controller may vary depending on the error amplifier characteristic. In case of a temporary fault, it is necessary to recycle input power to restart the PWM controller circuit. Also, the fault-delay time must exceed the soft-start-delay time, or the PWM controller will not start. The protection arrangement used in the TL5001 PWM Controller is designed specifically to be used with the TL5001, and may require modification to be applied to other regulator topologies.

The circuits of FIGS. 1 and 2 are described in the Texas Instruments documents *Designing With the TL5001 PWM Controller,* SLVA034A, September 1995, and TL5001, TL5001 V *Pulse-Width-Modulation Control Circuits,* SLVS084S—April 1994—Revised September 1995. The entire contents of both documents are incorporated herein by reference.

There is a need for a fault protection arrangement which can be used with any regulator topology. There is a need for such a fault protection arrangement to have a well defined and consistent trip point in the event of an overcurrent or short circuit fault which trip point does not vary depending upon the characteristics of an error amplifier in the fault protection arrangement. There is further a need for such a fault protection arrangement in which the fault-delay time may be selected to be independent of the soft-start-delay time.

SUMMARY OF THE INVENTION

The present invention provides a fault protection arrangement useful for protecting power conversion circuits, for example switch mode power supplies and the like, from overcurrent and short circuit faults. The fault protection arrangement of the invention includes multiple fault protection features, for example soft-start delay, fault delay and automatic reset, with the timing of each of these three features capable of being set independently of the other two. The fault protection arrangement of the invention provides for these features while minimizing integrated circuit (IC) pin count and also minimizing the number of external components required for programming the timing of these features. The automatic fault protection and reset capability provides a very low short circuit condition which is an advantage for the reliability of both the power circuit and the load. The fault protection circuit of the invention may be used to advantage with any power conversion regulator topology.

In a first aspect, the invention provides a fault protection arrangement, for protecting a power conversion circuit from overcurrents, the power conversion circuit having a power conversion circuit input, in use, coupled to a power source, a power conversion circuit output having an output voltage, the power conversion circuit output, in use, coupled to a load, and control means for controlling operation of the power conversion circuit, the power conversion circuit supplying power to the load when the control means is in an enabled state and not supplying power to the load when the control means is in a disabled state, the fault protection arrangement comprising comparison means having a comparison means input and a comparison means output, the comparison means input coupled to the power conversion circuit output, the comparison means output in a normal state when the power conversion circuit output voltage is above a predetermined fault voltage and in a fault state when the power conversion circuit output voltage is below the fault voltage, soft-start means for delaying operation of the fault protection arrangement for a first predetermined time when the power conversion circuit is coupled to the power source, a control output coupled to the control means, the control output causing the control means to switch from the enabled state to the disabled state when the comparison means output changes from the normal state to the fault state, fault delay means for delaying the control output a second predetermined time in changing the control means from the enabled state to the disabled state after the comparison means output changes from the normal state to the fault state, and reset means for resetting the control means to the enabled state a third predetermined time after the comparison means output changes from the normal state to the fault state, wherein the first predetermined time, the second predetermined time and the third predetermined time are all determined by a common capacitance.

In a preferred embodiment of the invention, the fault protection arrangement is used to protect a switch mode power supply from overcurrent and short circuit faults.

While the first predetermined time, the second predetermined time and the third predetermined time are all determined by a common capacitance, the three predetermined times may be independently selectable, with the first predetermined time determined by a soft-start reference voltage and the common capacitance, the second predetermined time determined by a fault delay reference voltage and the common capacitance, and the third predetermined time determined by a reset reference voltage and the common capacitance. This serves to minimize integrated circuit (IC) pin count in fault protection circuits of the invention while also minimizing the number of external components, e.g. one capacitor, required to programming the timing of the soft-start, fault delay and reset times.

DETAILED DESCRIPTION OF THE INVENTION

Figure 1:
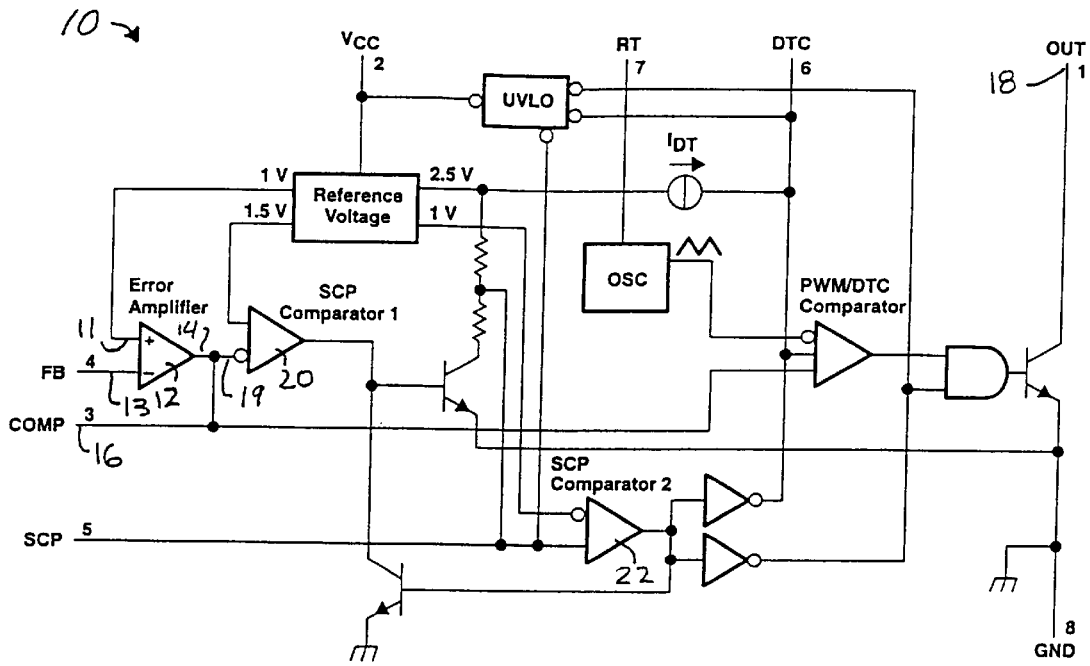
FIG. 1 is a functional block diagram of a TL5001 Pulse Width Modulation Controller Circuit.
Figure 2:
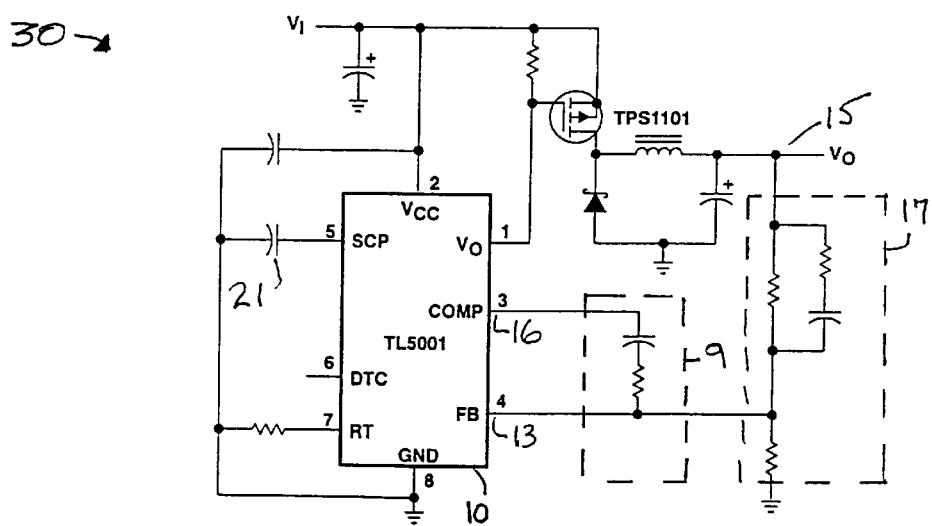
FIG. 2 is a schematic diagram for a power supply application of the TL5001 Pulse Width Modulation Controller Circuit.
Figure 3:
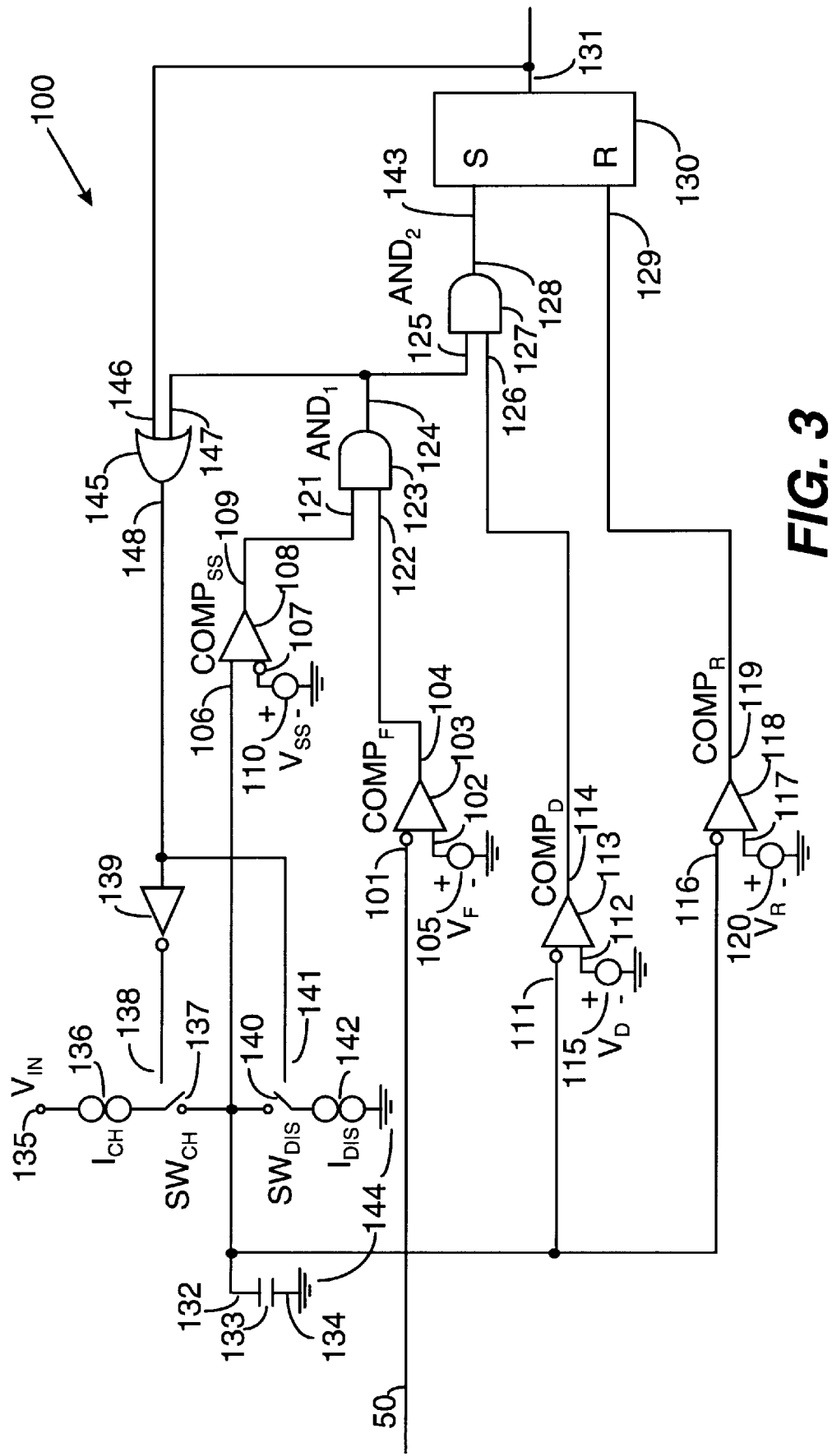
FIG. 3 is a schematic diagram of an embodiment of a fault protection arrangement of the invention.

FIG. 3 is a schematic diagram of an embodiment of a fault protection arrangement of the invention. In the embodiment illustrated in FIG. 3, the protection circuit 100 monitors the output voltage of a power supply directly. A power supply output 50 is coupled to an inverting input 101 of a fault comparator ($COMP_F$) 103. A fault reference voltage ($V_F$) 105 is coupled to a non-inverting input 102 of the fault comparator 103. An output 104 of the fault comparator 103 is coupled to a first input 122 of a first AND gate ($AND_1$) 123. A second input 121 of the first AND gate 123 is coupled to an output 109 of a soft-start comparator ($COMP_{ss}$) 108. A non-inverting input 106 of the soft-start comparator 108 is coupled to a first terminal 132 of a capacitor 133, and an inverting input 107 of the soft-start comparator 108 is coupled to a soft-start reference voltage ($V_{ss}$) 110. A second terminal 134 of the capacitor 133 is coupled to ground 144.

An output 124 of the first AND gate 123 is coupled to a first input 125 of a second AND gate ($AND_2$) 127. A second input 126 of the second AND gate 127 is coupled to an output 114 of a delay comparator ($COMP_D$) 113. An inverting input 111 to the delay comparator 113 is coupled to the capacitor first terminal 132, and a non-inverting input 112 of the delay comparator 113 is coupled to a delay reference voltage ($V_D$) 115.

An output 128 of the second AND gate 127 is coupled to a set (S) input 143 of a flip-flop 130. A reset (R) input 129 of the flip-flop 130 is coupled to an output 119 of a reset comparator ($COMP_R$) 118. An inverting input 116 of the reset comparator 118 is coupled to the capacitor first terminal 132, and a non-inverting input 117 of the reset comparator 118 is coupled to a reset reference voltage ($V_R$) 120.

A charge current source ($I_{CH}$) 136 is coupled between an input reference voltage ($V_{IN}$) 135 and the capacitor first terminal 132. A discharge current source ($I_{DIS}$) 142 is coupled between the capacitor first terminal 132 and ground 144. A charge solid state switch ($SW_{CH}$) 137 is coupled in series between the charge current source 136 and the capacitor first terminal 132, and a discharge solid state switch ($SW_{DIS}$) 140 is coupled in series between the discharge current source 136 and the capacitor first terminal 132. The charge solid state switch 137 and discharge solid state switch 140 may each comprise a bipolar transistor, a field effect transistor (FET), or the like.

The output 124 of the first AND gate 123 is coupled to a first input 147 of an OR gate 145, and the output of the flip-flop 131 is coupled to a second input 146 of the OR gate 145. An output 148 of the OR gate 145 is coupled to a discharge solid state switch control terminal 141 (e.g., base of bipolar transistor, gate of FET, etc.). The OR gate output 148 is also coupled through an inverter 139 to a charge solid state switch control terminal 138 (e.g., base of bipolar transistor, gate of FET, etc.). Both the charge solid state switch 137 and discharge solid state switch 140 are normally open when the input at their respective control terminals 138, 141 is low. When the OR gate output 148 is low, the discharge solid state switch 140 is open and the charge solid state switch 138 is closed, thereby closing a circuit through the charge current source 136, the charge solid state switch 138, and the capacitor 133 to ground 144. When the OR gate output 148 is high, the charge solid state switch 136 is open and the discharge solid state switch 140 is closed, thereby closing a circuit through the discharge current source 142, the discharge solid state switch 140, and the capacitor 133 to ground 144.

The flip-flop output 131 is fed back to an enable/disable input of the power supply (not illustrated).

During operation, the power supply output voltage 50 is monitored by the fault comparator 103. If the power supply output voltage 50 falls below the fault reference voltage 105, the fault comparator output 104 switches high. If the soft-start comparator output 109 is also high, then the first AND gate output 124 switches high. If the delay comparator output 114 is also high, then the second AND gate output 128 switches high. When the second AND gate output 128 switches high, the flip-flop set input 143 switches high, causing the flip-flop output 131 to switch high. When the flip-flop output 131 switches high, the power supply disable input (not illustrated) switches high and disables the power supply output 50.

As indicated above, in order for the protection circuit 100 to set the flip-flop output 131 high, three events must occur: the fault comparator 104 determines that the voltage at the power supply output 50 has fallen below the fault reference voltage 105, thereby indicating an overcurrent or short circuit condition at the power supply output 50; the delay comparator 114 determines that the overcurrent or short circuit condition has persisted for longer than a specified delay time, and is, therefore, not merely a transient condition; and, the soft-start comparator 109 determines that power has been applied to the power supply and the protection circuit 100 for longer than a specified soft-start time, and the fault is, therefore, not a transient condition at power-on of the arrangement.

The coordination of the three events, i.e. soft-start, fault and delay, is accomplished as follows. When the protection circuit 100 is powered-on, the charge solid-state switch 136 is closed, and the capacitor 133 is charged by the charge current source 136. The rate at which the capacitor 133 charges depends on the capacitance of the capacitor 133. When the voltage across the capacitor 133 exceeds the soft-start reference voltage 110, the soft-start comparator output 109 switches high.

Under normal operating conditions, the voltage at the power supply output 50 is above the fault reference voltage 105. Since the power supply output 50 is coupled to the fault comparator inverting input 101, the fault comparator output 104 is low during normal operating conditions. However, with the soft-start comparator output 109 high, when a fault occurs, and the fault comparator output 104 switches high, the first AND gate output 124 switches high. When the first AND gate output 124 switches high, the OR gate output 148 switches high, and the charge solid-state switch control input 138 and discharge solid state switch control input 141 switch states, with the charge solid state switch control input 138 going low and the discharge solid state switch control input 141 going high. As a result, the charge solid state switch 137 opens, disconnecting the charge current source 136 from the capacitor 133, and the discharge solid-state switch 140 closes, coupling the discharge current source 142 to the capacitor 133.

If the power supply output voltage 50 rises back above the fault reference voltage 105 before the capacitor 133 discharges to below the delay reference voltage 115, the fault comparator output 104 will switch low, the first AND gate output 121 will switch low, and the OR gate output 148 will switch low. The OR gate output 148 switching low will cause the charge solid state switch 137 and discharge solid state switch 140 to again switch states, connecting the charge current source 136 and disconnecting the discharge current source 142. The capacitor 133 will start to charge up again, and the fault will be ignored as a transient.

If, however, the overcurrent or short circuit fault persists, when the voltage across the capacitor 133 falls below the delay reference voltage 115, the delay comparator output 114 switches high. With the delay comparator output 114 high and the first AND gate output 124 high, the second AND gate output 128 switches high, causing the flip-flop set input 143 to switch high and set the flip-flop output 131 to high. The flip-flop output 131 is coupled to disable the output of the power supply (not illustrated).

When the flip-flop output 131 is high (SET), the OR gate output 148 remains high regardless of the states of the soft-start comparator 108, the fault comparator 103 and the first AND gate 123. Thus, once the flip-flop 130 is SET, the flip-flop 130 will remain SET, and the capacitor 133 will continue to discharge. If the voltage across the capacitor 133 falls below the restart reference voltage 110, then the restart comparator output 119 switches high causing the flip-flop reset input 129 to switch high, thereby resetting the flip-flop output 131 to low. This allows the regulator to restart. The OR gate output 148 switches low, and the charge solid state switch 137 and discharge solid state switch 140 switch states, disconnecting the discharge current source 142 and coupling the charge current source 136 to the capacitor 133.

With the flip-flop output 131 low, the power supply restarts, and the protection circuit 100 goes through its power-on process described above.

If the fault persists, the protection circuit 100 will detect the fault and disable the power supply output 50 again. The protection circuit can continue to attempt to reset and restart the power supply circuit until the fault is corrected or power is removed. The protection circuit can also be configured to attempt to restart the power supply circuit a predetermined number of attempts, or for a predetermined period of time, and then shut down until the fault is removed and power cycled.

The soft-start time, delay time, and reset time are all a function of the capacitance of the capacitor 133 and their respective reference voltages, i.e. the soft-start reference voltage 110, the delay reference voltage 115, and the reset reference voltage 120. The delay reference voltage 115 is independent of the soft-start reference voltage 110. Therefore, the delay time is independent of the soft-start time. However, the fault comparator 103 cannot disable the regulator at start-up until both the soft-start comparator output 109 and delay comparator output 114 are both high. Therefore, a start-up transient will not prevent the power supply from operating.

Figure 4:
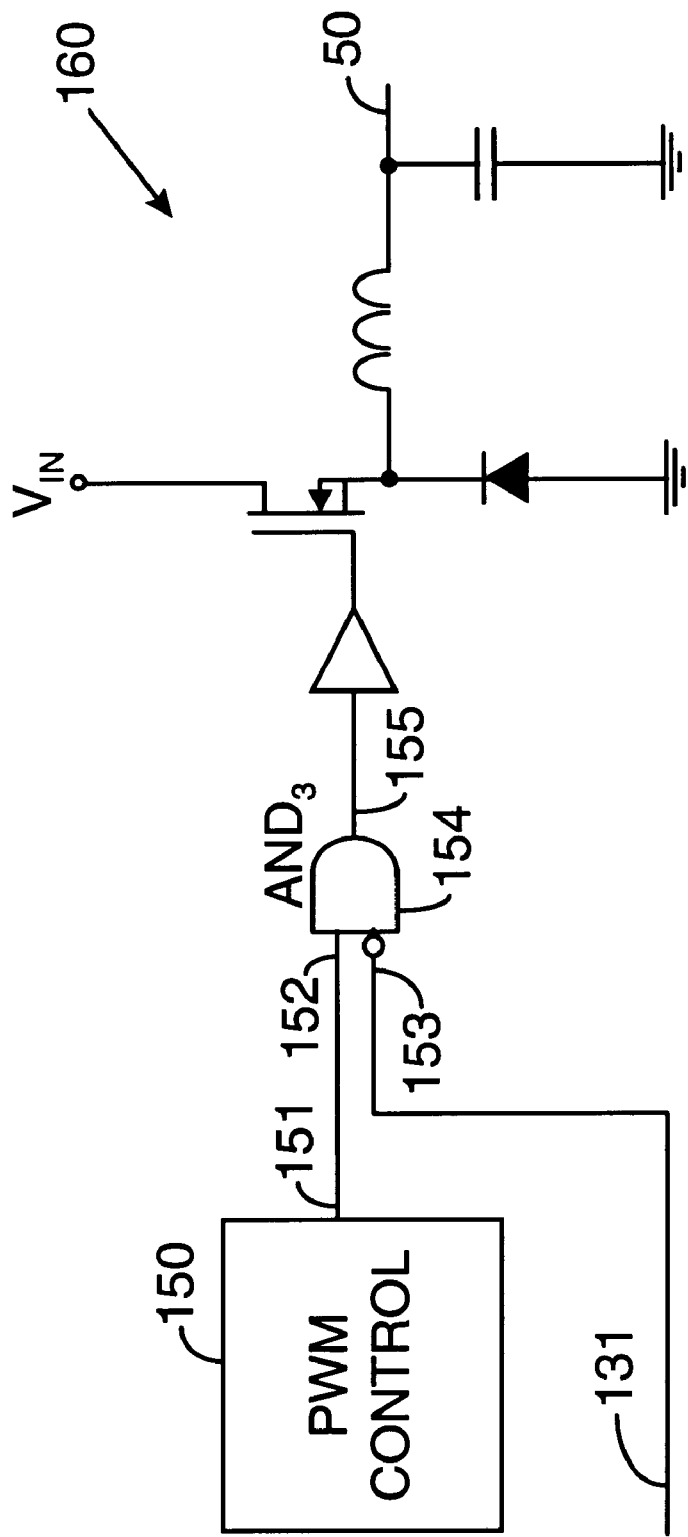
FIG. 4 illustrates a schematic of one embodiment of how the output of the protection arrangement may be used to disable the output of the power supply in case of a short circuit or overcurrent.

FIG. 4 illustrates one embodiment of how the output of the protection arrangement may be used to disable the output of the power supply in case of a short circuit or overcurrent. A switch-mode power supply circuit 160 is illustrated only to the extent necessary to show the operation of the protection arrangement 100 in disabling the output of the power supply circuit 160 in case of a short circuit or overcurrent fault. In the embodiment illustrated, the flip-flop output 131 is coupled to an inverting first input 153 of a third AND gate 154. A second, non-inverting input 152 of the AND gate 154 is coupled to a pulse width modulation (PWM) control output 151 of a PWM controller 150. Thus, when the flip-flop 130 is SET, and the flip-flop output 131 is high, the inverted high input prevents the third AND gate output 155 from switching in response to the switching output of the PWM controller 150, and the power supply output 50 remains low. The arrangement illustrated in FIG. 4 is only one of many arrangements by which the protection arrangement of the invention may be used to control, and therefore protect the output of a power supply.

It will be seen that the soft-start time, delay time and reset time share a single capacitor, and yet use different reference voltages. This allows the three times to be set independently of each other while minimizing the number of external components required to set the respective times.

The soft-start reference voltage 110, fault reference voltage 105, delay reference voltage 115 and reset reference voltage 120 may each be generated using techniques commonly used in the art, e.g. voltage dividers, zener diodes, and the like.

Referring again to FIG. 3, in some applications, it may be desirable or necessary to have the protection arrangement react immediately to a fault and not implement a fault delay. In such case the delay comparator 113 and second AND gate would not be included in the protection arrangement 100, and the first AND gate output 124 would be coupled directly to the set input 143 of the flip flop 130.

It will be readily apparent to a person skilled in the art that numerous modifications and variations of the present invention are possible in light of the above teachings. It is therefore to be understood that, within the scope of the appended claims, the invention may be practiced other than as specifically described herein.

We claim:

1. A fault protection arrangement, for protecting a power conversion circuit from overcurrents, the power conversion circuit having
    a power conversion circuit input, in use, coupled to a power source,
    a power conversion circuit output having an output voltage, the power conversion circuit output, in use, coupled to a load, and
    control means for controlling operation of the power conversion circuit, the power conversion circuit supplying power to the load when the control means is in an enabled state and not supplying power to the load when the control means is in a disabled state,
the fault protection arrangement comprising
    soft-start means for delaying operation of the fault protection arrangement for a first predetermined time when the power conversion circuit is coupled to the power source,
    comparison means having a comparison means input and a comparison means output, the comparison means input coupled to the power conversion circuit output, the comparison means output in a normal state when the power conversion circuit output voltage is above a predetermined fault voltage and in a fault state when the power conversion circuit output voltage is below the fault voltage,
    a control output coupled to the control means, the control output causing the control means to switch from the enabled state to the disabled state when the comparison means output changes from the normal state to the fault state,
    fault delay means for delaying the control output a second predetermined time in changing the control means from the enabled state to the disabled state after the comparison means output changes from the normal state to the fault state, and
    reset means for resetting the control means to the enabled state a third predetermined time after the comparison means output changes from the normal state to the fault state,
    wherein the first predetermined time, the second predetermined time and the third predetermined time are all determined by a common capacitance.

2. A fault protection arrangement according to claim 1, wherein the first predetermined time is determined by the common capacitance and a first reference voltage, the second predetermined time is determined by the common capacitance and a second reference voltage, and the third predetermined time is determined by the common capacitance and a third reference voltage.

3. A fault protection arrangement according to claim 1, wherein the power conversion circuit is a switch mode power supply.

4. A fault protection arrangement according to claim 1, wherein the comparison means comprises a comparator, the comparator having a first input which is coupled to the power conversion circuit output.

5. A fault protection arrangement according to claim 4, wherein the comparator has a second input which is coupled to a fault reference voltage.

6. A fault protection arrangement according to claim 1, wherein the fault delay means comprises a comparator, the comparator having a first input which is coupled to the common capacitance.

7. A fault protection arrangement according to claim 6, wherein the comparator has a second input which is coupled to a delay reference voltage.

8. A fault protection arrangement according to claim 1, wherein the reset means comprises a comparator, the comparator having a first input which is coupled to the common capacitance.

9. A fault protection arrangement according to claim 8, wherein the comparator has a second input which is coupled to a reset reference voltage.

10. A fault protection arrangement according to claim 1, wherein the soft-start means comprises a comparator, the comparator having a first input which is coupled to the common capacitance.

11. A fault protection arrangement according to claim 10, wherein the comparator has a second input which is coupled to a soft-start reference voltage.

12. A fault protection arrangement according to claim 1 wherein the control output comprises a flip-flop.

13. A fault protection arrangement, for protecting a power conversion circuit from overcurrents, the power conversion circuit having
    a power conversion circuit input, in use, coupled to a power source,
    a power conversion circuit output having an output voltage, the power conversion circuit output, in use, coupled to a load, and
    control means for controlling operation of the power conversion circuit, the power conversion circuit supplying power to the load when the control means is in an enabled state and not supplying power to the load when the control means is in a disabled state,
the fault protection arrangement comprising
    soft-start means for delaying operation of the fault protection arrangement for a first predetermined time when the power conversion circuit is coupled to the power source,
    comparison means having a comparison means input and a comparison means output, the comparison means input coupled to the power conversion circuit output, the comparison means output in a normal state when the power conversion circuit output voltage is above a predetermined fault voltage and in a fault state when the power conversion circuit output voltage is below the fault voltage,
    a control output coupled to the control means, the control output causing the control means to switch from the enabled state to the disabled state when the comparison means output changes from the normal state to the fault state, fault delay means for delaying the control output a second predetermined time in changing the control means from the enabled state to the disabled state after the comparison means output changes from the normal state to the fault state, and reset means for resetting the control means to the enabled state a third predetermined time after the comparison means output changes from the normal state to the fault state, wherein the first predetermined time is determined by a soft-start reference voltage and a common capacitance, the second predetermined time is determined by a fault delay reference voltage and the common capacitance, and the third predetermined time is determined by a reset reference voltage and the common capacitance.

14. A fault protection arrangement, for protecting a power conversion circuit from overcurrents, the power conversion circuit having a power conversion circuit input, in use, coupled to a power source, a power conversion circuit output having an output voltage, the power conversion circuit output, in use, coupled to a load, and control means for controlling operation of the power conversion circuit, the power conversion circuit supplying power to the load when the control means is in an enabled state and not supplying power to the load when the control means is in a disabled state, the fault protection arrangement comprising soft-start means for delaying operation of the fault protection arrangement for a first predetermined time when the power conversion circuit is coupled to the power source, comparison means having a comparison means input and a comparison means output, the comparison means input coupled to the power conversion circuit output, the comparison means output in a normal state when the power conversion circuit output voltage is above a predetermined fault voltage and in a fault state when the power conversion circuit output voltage is below the fault voltage, a control output coupled to the control means, the control output causing the control means to switch from the enabled state to the disabled state when the comparison means output changes from the normal state to the fault state and, reset means for resetting the control means to the enabled state a second predetermined time after the comparison means output changes from the normal state to the fault state, wherein the first predetermined time and the second predetermined time are determined by a common capacitance.

15. A fault protection arrangement according to claim 14, wherein the first predetermined time is determined by the common capacitance and a first reference voltage, and the second predetermined time is determined by the common capacitance and a second reference voltage.

* * * * *